(12) United States Patent
Narita

(10) Patent No.: US 8,264,923 B2
(45) Date of Patent: Sep. 11, 2012

(54) OPTICAL DISC DEVICE

(75) Inventor: Mai Narita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 12/783,063

(22) Filed: May 19, 2010

(65) Prior Publication Data

US 2010/0296376 A1  Nov. 25, 2010

(30) Foreign Application Priority Data

May 21, 2009 (JP) ................................. 2009-122781

(51) Int. Cl.
G11B 7/00 (2006.01)

(52) U.S. Cl. .................................. 369/44.29; 369/44.36

(58) Field of Classification Search ............... 369/44.29, 369/44.35, 44.32, 44.23, 112.23, 112.24, 369/94, 44.36
See application file for complete search history.

(56) References Cited

U.S. PATENT DOCUMENTS

| | | | |
|---|---|---|---|
| 4,764,860 A | 8/1988 | Takao ............................. 369/43 |
| 2001/0053163 A1* | 12/2001 | Furukawa ........................ 372/24 |
| 2003/0053387 A1 | 3/2003 | Lee et al. ................... 369/53.18 |
| 2004/0228232 A1 | 11/2004 | Takahashi et al. |
| 2005/0141363 A1* | 6/2005 | Shimamoto et al. ....... 369/44.29 |
| 2005/0237873 A1* | 10/2005 | Maruyama et al. ...... 369/112.05 |
| 2006/0062098 A1* | 3/2006 | Miyake et al. ............. 369/44.11 |
| 2007/0008836 A1* | 1/2007 | Imagawa et al. ........... 369/44.23 |
| 2007/0109923 A1* | 5/2007 | Mizuno et al. .................. 369/43 |
| 2007/0159951 A1* | 7/2007 | Sagara .......................... 369/106 |
| 2007/0183278 A1* | 8/2007 | Yamada et al. ............ 369/44.29 |
| 2007/0280064 A1 | 12/2007 | Fujita |
| 2008/0056094 A1* | 3/2008 | Nakao et al. ..................... 369/94 |
| 2008/0175111 A1* | 7/2008 | Hamada ...................... 369/44.32 |
| 2008/0310263 A1* | 12/2008 | Sagara ........................ 369/44.32 |
| 2010/0074067 A1* | 3/2010 | Komma et al. ............ 369/44.32 |

FOREIGN PATENT DOCUMENTS

| | | |
|---|---|---|
| EP | 1 067 530 A2 | 1/2001 |
| EP | 2 015 298 A1 | 1/2009 |
| JP | 8339554 | 12/1996 |
| JP | 09-180203 | 7/1997 |
| JP | 2001-250256 | 9/2001 |
| JP | 2004-253049 | 9/2004 |
| JP | 2004-342221 | 12/2004 |
| JP | 2007226904 | 9/2006 |
| JP | 2007-026611 | 2/2007 |
| JP | 2007-328827 | 12/2007 |
| JP | 2008103029 | 5/2008 |

* cited by examiner

*Primary Examiner* — Thang Tran
(74) *Attorney, Agent, or Firm* — Morgan, Lewis & Bockius LLP

(57) ABSTRACT

An optical disc device including: a light source; an object lens to focus light emitted from the light source on an information recording surface of an optical disc; a movable lens that is arranged on an optical path between the light source and the objective lens and arranged such that position thereof is adjustable along a direction of a light axis; a lens moving portion to move the movable lens along the direction of the light axis; a tracking servo system which makes a beam spot that is formed of the light from the light source through focusing by the objective lens keep on track of the optical disc; and a control part which controls gain of a servo loop of the tracking servo system is made temporarily larger when the movable lens is moved by the lens moving portion in comparison with a case where moving of the movable lens by the lens moving portion is not performed.

4 Claims, 6 Drawing Sheets

OPTICAL DISC DEVICE

This application is based on Japanese Patent Application No. 2009-122781 filed on May 21, 2009, and the contents of which are hereby incorporated by reference.

BACKGROUND OF THE INVENTION

1. Field of the Invention

The present invention relates to an optical disc device which is used when reproduction of information recorded in an optical disc is performed, or recording of information in an optical disc is performed.

2. Description of Related Art

From the past, in an optical pickup provided in an optical disc device, there are some optical pickup including a spherical aberration correction mechanism in order to perform correction of the spherical aberration (for example, see patent documents 1 to 4).

FIG. 9 is a schematic diagram to show an example of structure of a conventional optical pickup including a spherical aberration correction mechanism. In the conventional optical pickup 10, laser light emitted from a light source 101 is divided by a diffraction element 102 into main light and two sub lights, and reflected by a polarization beam splitter 103. The laser light reflected by the polarization beam splitter 103 is converted by a quarter wave plate 104 into circular polarized light, and passes through a collimator lens 105. The laser light which passes though the collimator lens 105 is reflected by a raising mirror 106, and is focused by an object lens 107 on an information recording layer 100a of an optical disc 100. Returned light reflected by the information recording layer 100a of the optical disc 100 passes through the object lens 107, the raising mirror 106, and the collimator lens 105 in this order, and is converted by the quarter wave plate 104 into linear polarized light. The returned light converted into the linear polarized light passes through the polarization beam splitter 103, is given astigmatism by a cylindrical lens 108, and is gathered into a photo detector 109.

The photo detector 109 converts received light signal into electric signal. The converted electric signal is processed by a signal processing device which is not shown, to generate reproduced RF signal, focus error signal (FE signal), tracking error signal (TE signal) and the like. An object lens actuator 20 is driven based on the generated FE signal and TE signal, to perform focus servo control and tracking servo control. In this respect the focus servo control is a control to be performed so that positional relation between the object lens 107 and the optical disc 100 is kept in a constant relation. Further, the tracking servo control is a control to be performed so that a beam spot focused by the object lens 107 always traces a track formed on the optical disc 100.

By the way, in a conventional optical pickup 10, the collimator lens 105 can be moved along a light axis direction (direction shown by arrow A in FIG. 9) by a lens moving portion 30. By adjusting position of the collimator lens 105 along the light axis direction, a converging state or a diverging state of light output from the collimator lens 105 can be adjusted. By this arrangement, correction of spherical aberration can be performed through adjustment of the converging state and the diverging state of light input to the object lens 107 by adjusting position of the collimator lens 105 by the lens moving portion 30 along the light axis direction. That is, the conventional optical pickup 10 includes a spherical aberration correction mechanism composed by the collimator lens 105 and the lens moving portion 30.

FIG. 10 is a schematic perspective view to show an example of structure of the lens moving portion provided in the conventional optical pickup. The lens moving portion 30 included in the conventional optical pickup 10 is provided with a stepping motor 301, a lead screw 302, a lead nut 303, a lens holder 304, two guide shafts 305a, 305b, a pressure spring 306, and a photo interrupter 307, as shown in FIG. 10. For example, the lens moving portion 30 may be fixed directly on a base, not shown, which is provided in the optical pickup 10.

When the stepping motor 301 is driven, the lead screw 302 that is fixed on an output axis of the stepping motor 301, is rotated. The lead nut 303 is moved in a direction which is parallel to a longer direction of the lead screw 302 along with rotation of the lead screw 302. In this respect, moving direction of the lead nut 303 is changed by rotating direction of the stepping motor 301.

The lens holder 304 having a through hole 304a to hold the collimator lens 105, is configured to slide along two guide shafts 305a, 305b which extend in a direction that is parallel to the light axis of the collimator lens 105. The pressure spring 306 which is formed in a coil shape, is fitted freely on one of the guide shaft 305a to give biasing force to the lens holder 304.

When the lead nut 303 is moved away from the stepping motor 301, the lens holder 304 is pushed by the lead nut 303 and is moved against the biasing force of the pressure spring 306. On the other hand, when the lead nut 303 is moved toward the stepping motor 301, the lens holder 304 is pushed by the biasing force of the pressure spring 306 and is moved while contacted with the lead nut 303.

In the lens holder 304, a protruding portion 304b is provided so that detection by the photo interrupter 307 becomes possible. When this protruding portion 304b interrupts light from a light emitting part to a light receiving part (both are not shown) of the photo interrupter 307, it is judged that the lens holder 304 exists at a reference position by the photo interrupter 307. Then, position of the lens holder 307 is controlled by using amount of steps of the stepping motor 301 from the reference position.

The optical pickup 10 including this kind of the spherical aberration correction mechanism is convenient because correction of the spherical aberration can be performed by only performing the positional adjustment of the collimator lens 105 in the light axis direction utilizing the abovementioned lens moving portion 30.

[Patent Document 1] JP-A-2001-250256
[Patent Document 2] JP-A-2007-328827
[Patent Document 3] JP-A-2004-342221
[Patent Document 4] JP-A-2007-026611

SUMMARY OF THE INVENTION

However, as a result of earnest research by inventor of the present invention, it is revealed that following problem occurs in the above described conventional optical pickup. That is, in the conventional optical pickup 10, when the collimator lens 105 is moved to perform the correction of spherical aberration, there is a case where servo control becomes out of order because disorder in the TE signal is generated while the collimator lens 105 is moved. Describing in detail, when the lens moving portion 30 is driven, vibration is generated in the optical pickup 10 by back lash in the lens moving portion 30, then, disturbance caused by the vibration is loaded on the object lens actuator 20 on which the object lens 107 is arranged. Further, the disturbance appears especially as the disorder in TE signal, the tracking servo control is influenced significantly.

The correction of the spherical aberration is performed, for example, before beginning of reproducing the optical disc, or while the optical disc is reproduced as the case may be. If the servo control is made out of order, it is not preferable that time period till beginning of reproducing becomes long, for example, as retrying operation is repeated, or the like, because of above described reason due to driving of the spherical aberration correction mechanism before beginning of reproducing. Further, if the servo control is made out of order by the above described reason as a result that the spherical aberration correction mechanism is driven to achieve correction of the spherical aberration while reproducing is performed, it causes a problem that stable reproduction cannot be attained.

In view of the above described problem, it is an object of the present invention to provide an optical disc device in that out of order of the servo control is hardly caused when change of setting is achieved to perform correction of the spherical aberration.

To attain the above described object, the optical disc device according to the present invention includes: a light source; an object lens to focus light emitted from the light source on an information recording surface of an optical disc; a movable lens that is arranged on an optical path between the light source and the objective lens and arranged such that position thereof is adjustable along a direction of a light axis; a lens moving portion to move the movable lens along the direction of the light axis; a tracking servo system which makes a beam spot that is formed of the light from the light source through focusing by the objective lens keep on track of the optical disc; and a control part which controls gain of a servo loop of the tracking servo system is made temporarily larger when the movable lens is moved by the lens moving portion in comparison with a case where moving of the movable lens by the lens moving portion is not performed.

According to this structure, it is possible to prevent influence of disturbance which is caused in the servo tracking system by the vibration accompanied by driving of the lens moving portion. That is, according to the structure, when correction of the spherical aberration is performed by making positional adjustment in direction of the light axis of the movable lens, possibility of occurrence that servo control becomes out of order can be reduced. In the structure, when the lens moving portion is driven, as an exceptional measure, gain of servo loop in the tracking servo system is made temporarily large. Because possibility of occurrence of oscillation of the tracking servo is reduced by appropriately selecting level of factor to make the gain of servo loop large, the above described effect can be obtained.

The optical disc device structured as above may further include a temperature detecting portion to detect environmental temperature and moving of the movable lens by the lens moving portion may be performed based on temperature that is detected by the temperature detecting portion.

When the object lens is formed by resin, for example, because amount of the spherical aberration becomes easily fluctuated by change of environmental temperature, there may be a case where need for performing correction of the spherical aberration by driving of the lens moving portion is generated while the optical disc device is reproduced. Because the optical disc device having this structure can cope with this kind of fluctuation of the spherical aberration, in addition, even when the optical disc device copes with fluctuation of the spherical aberration as above described, it can reduce possibility of the servo control becomes out of order, a useful optical disc device can be provided.

It is preferable that in the optical disc device structured as above, the movable lens is a collimator lens. With this structure, a useful optical disc device can be realized by simple structure.

According to the optical disc device of the present invention, possibility of the servo control becomes out of order can be reduced when setting for correction of the spherical aberration is changed. As a result of this, it is possible to reduce situation where the time until the reproduction of the optical disc becomes longer than the necessity, situation where stable reproduction cannot be performed due to out of the servo control while the disc is reproduced, or the like.

DETAILED DESCRIPTION OF THE PREFERRED EMBODIMENTS

Hereinafter, an embodiment of the optical disc device according to the present invention will be explained in detail with reference to drawings.

Figure 1:
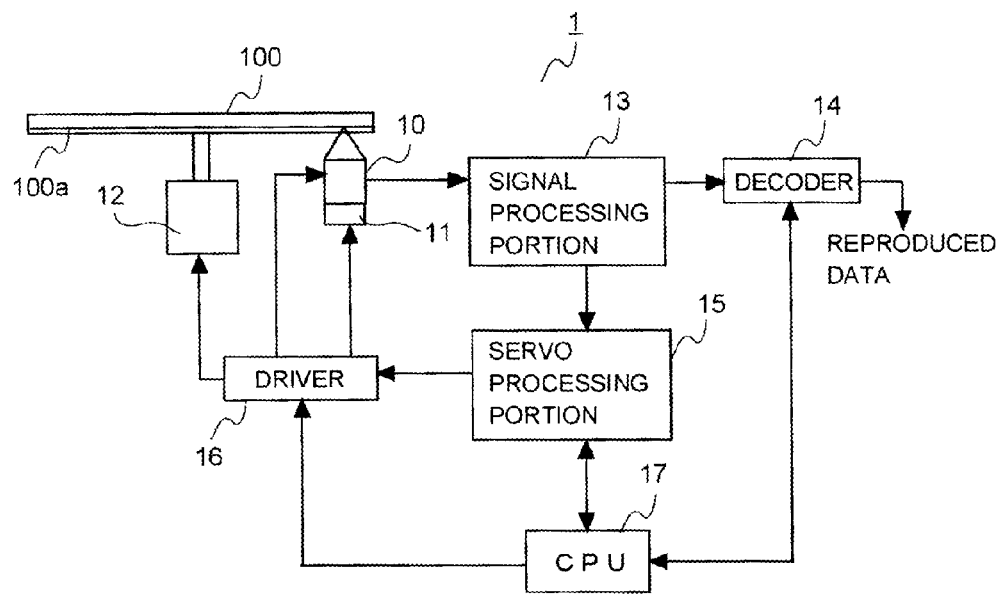
FIG. 1 is a block diagram to show structure of an optical disc device according to one embodiment of the present invention.

FIG. 1 is a block diagram to show structure of an optical disc device according to one embodiment of the present invention. As shown in FIG. 1, the optical disc device 1 according to the present embodiment includes an optical pickup 10, a sled motor 11, a spindle motor 12, a signal processing portion 13, a decoder 14, a servo processing portion 15, a driver 16 and a CPU (Central Processing Unit) 17.

Figure 9:
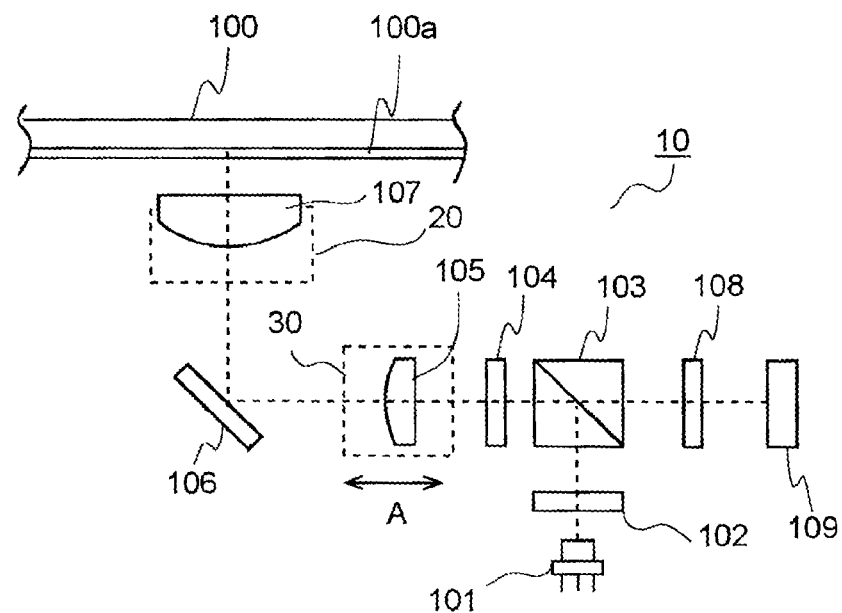
FIG. 9 is a schematic diagram to show an example of structure of the conventional optical pickup provided with a spherical aberration correction mechanism.
Figure 10:
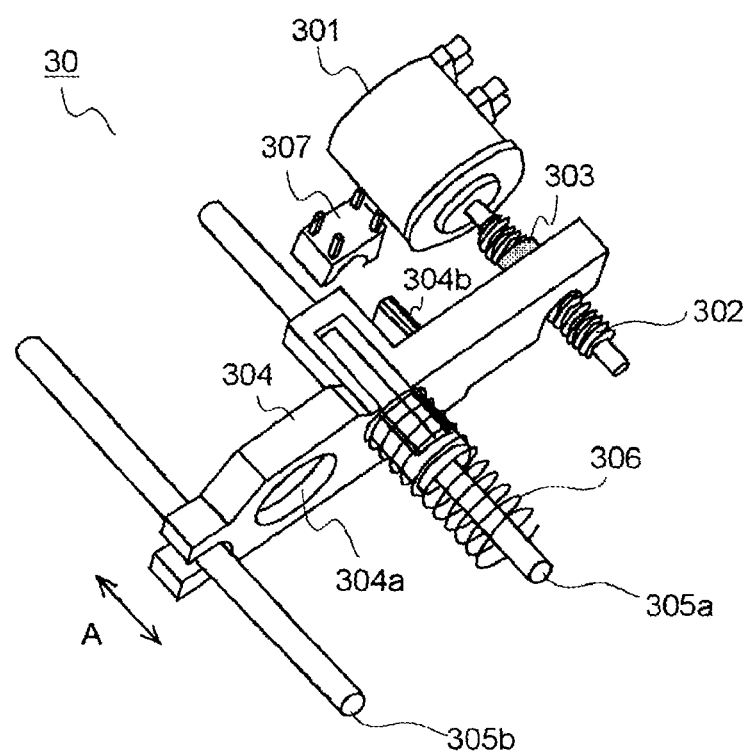
FIG. 10 is a schematic perspective view to show an example of structure of a lens moving portion provided in the conventional optical pickup.

The optical pickup 10 is a device to enables reading of information recorded on an optical disc 100. Structure of it is the same as the conventional optical pickup shown in FIG. 9. Therefore, explanation about structure of the optical pickup 10 is omitted here. Further, because structure of the optical pickup according to the present embodiment and that of the conventional optical pickup are the same, same reference numerals are used in the explanation. Same reference numerals are also used to explain constituting elements of the optical pickup 10 such as an object lens actuator 20 and a lens moving portion 30.

The sled motor 11 is a motor utilized to move the optical pickup 10 in a radial direction of the optical disc 100, the direction is the same as tracking direction and it corresponds to left and right direction in FIG. 1. Though it is not shown in drawings, a rack is arranged in a pickup base of the optical pickup 10, and the rack makes moving of the optical pickup 10 in radial direction possible in cooperation with a pinion fixed on an output shaft of the sled motor 11.

In the spindle motor 12 an output shaft thereof is connected to a turntable (not shown) which holds detachably the optical disc 100. As a result, the optical disc 100 which is held on the turntable is rotated by driving the spindle motor 12.

The signal processing portion 13 generates reproduced RF signal, FE signal and TE signal by processing electric signal output from a photo detector 109 (See, FIG. 9) in the optical pickup 10. Though, in the optical disc device 1 according to the present embodiment, the FE signal is obtained by an astigmatism method, and the TE signal is obtained by a differential push-pull method (DPP method), the present invention is not intended to be limited to this structure. Explanation about the astigmatism method and the differential push-pull method are omitted here because they are well known.

The decoder 14 reproduces information by performing predetermined demodulation process on the reproduced RF signal and outputs it as reproduced data.

The servo processing portion 15 receives the FE signal and the TE signal from the signal processing portion 13. Then, based on the FE signal, the servo processing portion 15 generates a focus driving signal to perform the focus servo control. In addition, based on the TE signal, the servo processing portion 15 generates a tracking driving signal to perform the tracking servo control. The servo processing portion 15 generates a driving signal to drive the sled motor 11.

The driver 16 includes an object lens actuator driver to control the object lens actuator 20 (See, FIG. 9), a lens moving portion driver to control the lens moving portion 30 (See, FIG. 9), a sled motor driver to control the sled motor 11, a light source driver to control the light source 101 (See, FIG. 9) and a spindle motor driver to control the spindle motor 12.

The CPU 17 is connected to various portions and parts which compose the optical disc device 1, and executes appropriately control processing in response to operations that each of the portions and parts are configured to perform. In the CPU 17, Read Only Memory (ROM) and Random Access Memory (RAM) are provided though they are not shown in drawings. In ROM, various kind of parameters and operating programs are stored that are required by the CPU 17 to executes various kind of process. RAM is used as working area for the CPU 17 and is configured to store various kind of necessary information.

The general structure of the optical disc device 1 according to the present embodiment is as above. By the way, the optical disc device 1 according to the present embodiment has structure in that a spherical aberration correction mechanism is provided in order to correct the spherical aberration, composed by the collimator lens 105 that is a movable lens and the lens moving portion 30 (See, FIG. 9 for both of them). Therefore, as above described, the possibility that tracking servo control becomes out of order is increased by disturbance due to driving of the lens moving portion 30 while the correction for spherical aberration is performed. Accordingly, in the optical disc device 1 according to the present embodiment, a contrivance is made to make the tracking servo control hardly out of order while correction of the spherical aberration is performed. Hereinafter, an explanation will be given about the contrivance.

Figure 2:
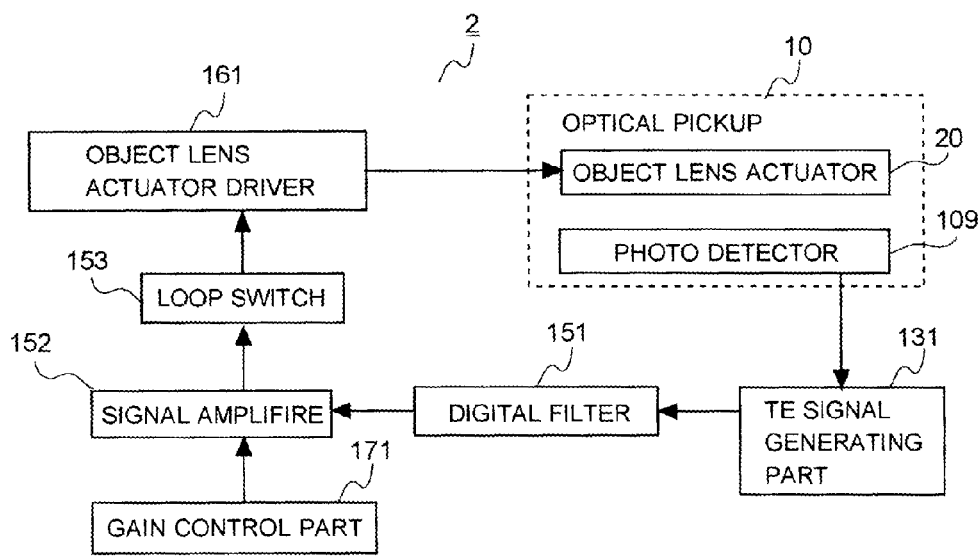
FIG. 2 is a block diagram to show structure of a tracking servo system provided in the optical disc device according to the present embodiment.

At first, the tracking servo system provided in the optical disc device 1 according to the present embodiment will be explained with reference to FIG. 2. FIG. 2 is a block diagram to show structure of the tracking servo system provided in the optical disc device according to the present embodiment. As shown in FIG. 2, elements composing the tracking servo system 2 according to the present embodiment include: the photo detector 109 and the object lens actuator 20 in the optical pickup 10; a TE signal generating part 131 in the signal processing portion 13; a digital filter 151, a signal amplifier 152 and a loop switch 153 in the servo processing portion 15; and an object lens actuator driver 161 which is an element included in the above described driver 16.

The TE signal generating part 131 generates TE signal by processing of signal output from the photo detector 109 in the optical pickup 10. This TE signal is processed with filtering by the digital filter 151 and amplified by the signal amplifier 152, such as an operational amplifier, that is arranged such that gain thereof is adjustable. In case where the loop switch 153 switched between an open state and close state of the tracking servo loop is closed, the signal amplified by the signal amplifier 152 is output to the object lens actuator driver 161.

The object lens actuator driver 161 converts the received signal into a signal for the tracking actuator driving, and outputs it to the object lens actuator 20. The term tracking actuator means a part that relates to moving of the object lens actuator 20 in the tracking direction. Then, the object lens actuator 20 performs the movement in the tracking direction in response to the driving signal received.

Figure 3:
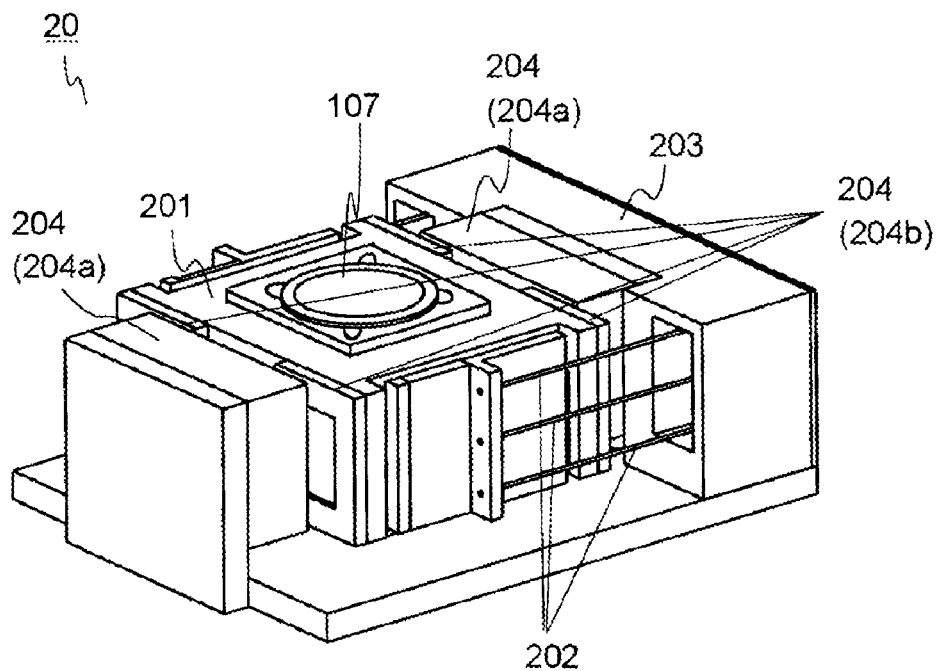
FIG. 3 is a schematic perspective view to show structure of an object lens actuator provided in the optical disc device according to the present embodiment.

FIG. 3 is a schematic perspective view to show structure of an object lens actuator provided in the optical disc device according to the present embodiment. As shown in FIG. 3, the object lens actuator 20 according to the present embodiment is formed as an object lens actuator having conventional structure in that a lens holder 201 to hold the object lens 107, a plurality of wires whose one ends are fixed on the lens holder 201, a suspension holder 203 which holds the lens holder 201 by supporting other ends of the wires 202 as a cantilever, and a driving member 204 which is composed of magnets 204a and coils 204b to drive the lens holder 201 in the focusing direction and the tracking direction, are provided.

In the tracking servo system 2 according to the present embodiment, structure is employed in that when moving of the collimator lens 105 is achieved by the lens moving portion 30 while the tracking servo control is performed, control is performed such that gain of the signal amplifier 152 is made temporarily large by a gain control part 171 in the CPU 17. Hereinafter, reason to take this structure will be explained.

Figure 4:
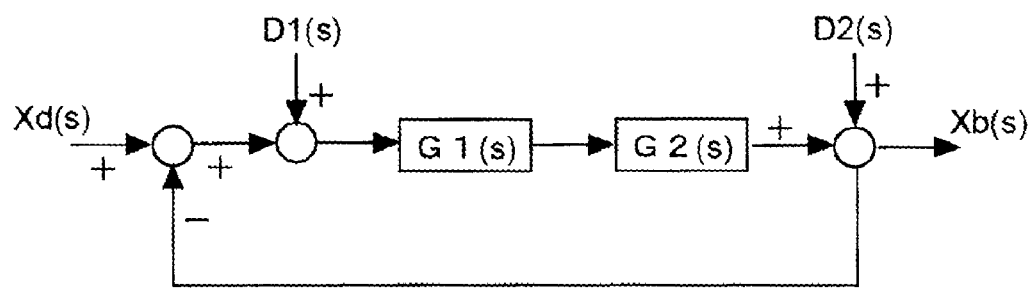
FIG. 4 is a block line diagram to show the tracking servo system provided in the optical disc device according to the present embodiment utilizing transfer function of LaPlace transformation.

FIG. 4 is a block line diagram to show the tracking servo system provided in the optical disc device according to the present embodiment utilizing transfer functions of LaPlace transformation. In FIG. 4, both of $G1(s)$ and $G2(s)$ are transfer functions of the tracking servo system 2, and $G1(s)$ is the transfer function of portions composed by the photo detector 109, the signal processing portion 13 and the servo processing portion 15, and $G2(s)$ is the transfer function for the object lens actuator 20. $Xd(s)$ shows a track position of the optical disc 100 and $Xb(s)$ shows a position of the beam spot. Further, $D1(s)$ and $D2(s)$ are disturbances to be applied on the tracking servo system 2, and $D1(s)$ is the disturbance to be applied on the TE signal and $D2(s)$ is the disturbance to be applied on the object lens actuator 20.

In this case, position of the beam spot Xb(s) can be described in below formula (1). In the formula (1), $G(s)=G1(s) \times G2(s)$.

$$Xb(s) = \frac{G(s)}{1+G(s)}Xd(s) + \frac{G(s)}{1+G(s)}D1(s) + \frac{1}{1+G(s)}D2(s) \quad (1)$$

As above described, as a result of research by inventor of the present invention, it is revealed that vibration is caused in optical pickup 10 due to the back lash in the lens moving portion 30 and the disturbance is loaded on the object lens actuator 20 when the lens moving portion 30 is driven. Influence caused by the disturbance $D2(s)$ loaded on the object lens actuator 20 can be prevented when gain of the servo loop $G(s)$ of the tracking servo system 2 is made larger as can be understood by the formula (1). Therefore, in the optical disc device 1 according to the present embodiment, structure is employed in that when moving of the collimator lens 105 is performed by the lens moving portion 30, gain of the servo loop G(s) of the tracking servo system 2 is temporarily made larger in comparison with ordinary case where moving of the collimator lens 105 by the lens moving portion 30 is not performed.

Explanation will be given about reason why it is temporarily to make gain of the servo loop of the tracking servo system 2 larger. When considering to prevent the disturbance loaded on the object lens actuator 20, it is the more preferable that gain of the servo loop of the tracking servo system 2 is made the larger. However, if gain of the servo loop of the tracking servo system 2 is made too large, because sensitivity of the servo becomes too high, there may be a case where the servo is caused to respond too sensitive for momentary disturbance of the TE signal, for example, by scratch on surface of the optical disc 100, therefore, the tracking servo control becomes unsatisfactory on the contrary.

Figure 5:
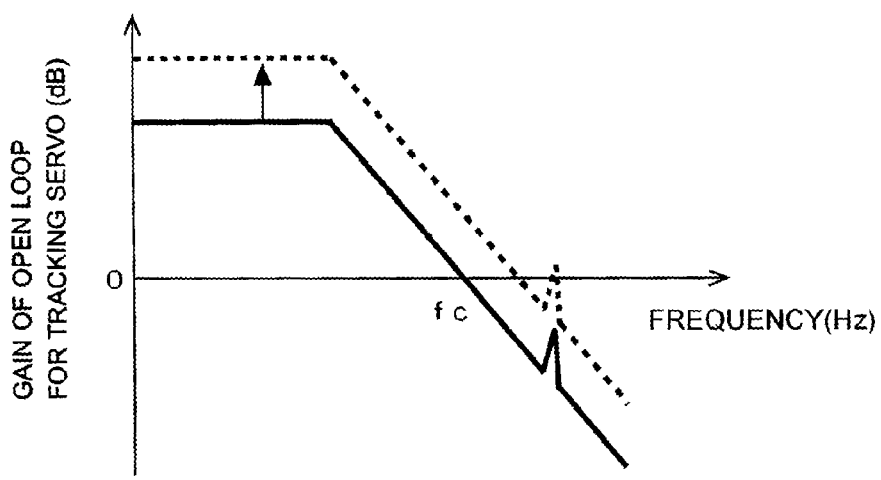
FIG. 5 is a schematic board line diagram to explain gain character of the tracking servo system.

Further, when higher order of resonance is included in the object lens actuator 20, and gain of the servo loop is set such that a crossover frequency fc is in high frequency side as shown by dotted line in FIG. 5, there may be a case where gain exceeds 0 dB at the resonance point. In such a case, the tracking servo system 2 is made to fall in an oscillation state. By this reason, it is not preferable that gain of the servo loop of the tracking servo system 2 is made too large. FIG. 5 is a board line diagram to show schematically gain character of the tracking servo system.

From above, in the optical disc device 1, gain of the servo loop that is the most appropriate crossover frequency fc is preliminarily obtained, and gain of the signal amplifier 152 is adjusted to have the most appropriate crossover frequency fc. As a result, it is preferable that gain of the servo loop of the tracking servo system 2 is not changed from a predetermined gain value in principle. However, when moving of the collimator lens 105 is performed by the lens moving portion 30, there occurs a situation where special measure is required. Thus, exceptionally, gain of the servo loop is made temporarily large.

However, even when gain of the servo loop is exceptionally made large, if gain of the servo loop is made too large, unsatisfactory result is caused on the contrary because oscillation or the like of the tracking servo system 2 is generated. For these reasons, in the optical disc device 1 according to the present invention, value to make large for gain of the servo loop is decided such that influence of the disturbance to the object lens actuator 20 caused by driving of the lens moving portion 30 is prevented and at the same time oscillation of the tracking servo system 2 is not generated.

Figure 6:
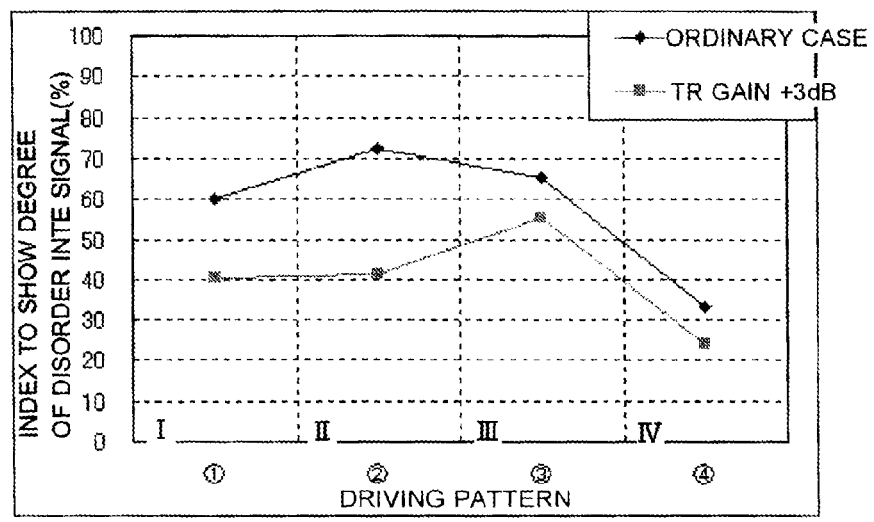
FIG. 6 is a graph to explain effect of making gain of servo loop for tracking servo system temporarily large when moving of a collimator lens is performed by a lens moving portion.

As one example, result was obtained in that it could prevent the tracking servo control to become out of order caused by driving of the lens moving portion 30 by making gain of the servo loop of the tracking servo system 2 large in 3 dB temporarily. FIG. 6 is a graph to explain effect of making gain of the servo loop for tracking servo system temporarily large when moving of the collimator lens is performed by the lens moving portion. In FIG. 6, "ordinary case" shows result for comparison in that gain of the servo loop of the tracking servo system 2 is not made temporarily large and is made constant. Further in FIG. 6, "Tr gain +3 dB" shows result of case where gain of the servo loop of the tracking servo system 2 is made temporarily larger in 3 dB than that in the ordinary case.

A vertical axis of the graph shown in FIG. 6 is an index (unit in percentage %) to show degree of disorder in the TE signal caused by driving of the lens moving portion 30. To be more precise, this index is obtained in steps as below. First, amplitude of the TE signal that is taken while driving of the lens moving portion 30, is acquired as amplitude A. Then, amplitude of the TE signal that is taken while rotation of the optical disc 100 is performed with only focus servo control and without tracking servo control, is acquired as amplitude B. Finally, the amplitude A is divided by the amplitude B and result is multiplied by one hundred to take percentage. The amplitude A is amplitude of the TE signal that is influenced by the disturbance. When amplitude A is acquired, the focus servo control and the tracking servo control are performed. Further, when amplitude B is acquired, the lens moving portion 30 is not driven. When the index is the smaller, it shows a situation where disorder of the TE signal is the less.

In addition, the collimator lens 105 is driven in four driving patterns to obtain above described index to show degree of disorder of the TE signal, and result for each pattern is acquired. Because of this, FIG. 6 shows graphs with the four driving patterns as horizontal axis. Details of the four driving patterns are as below. That is, a driving pattern "I" is a case where the collimator lens 105 is driven from an initial position by −10 steps of the stepping motor 301, a driving pattern "II" is a case where the collimator lens 105 is driven back to the initial position from the position where the pattern "I" is completed, a driving pattern "III" is a case where the collimator lens 105 is driven from an initial position by +10 steps of the stepping motor 301, and a driving pattern "IV" is a case where the collimator lens 105 is driven back to the initial position from the position where the pattern "III" is completed.

In this respect, the initial position of the collimator lens 105 is set at a position where output light from the collimator lens 105 becomes substantially parallel. Further, it is decided here that the step in plus direction is a direction where the collimator lens 105 comes closer to the raising mirror 106, and the step in minus direction is a direction where the collimator lens 105 comes away from the raising mirror 106.

As shown in FIG. 6, it can be read out that disorder of the TE signal is prevented by making gain of the servo loop of tracking servo system 2 temporarily large in +3 dB, when the lens moving portion 30 is driven, though differences are shown in each of the driving patterns.

Next, explanation will be given about switching process of gain of the servo loop of the tracking servo system 2 in the optical disc device 1 according to the present embodiment with reference to a flowchart shown in FIG. 7. In the optical disc device 1 according to the present embodiment, it is configured that gain of the servo loop of the tracking servo system 2 is switched temporarily when the collimator lens 105 is driven, that is, lens moving portion 30 is driven, while the focus servo control and the tracking servo control are performed (hereinafter, there may be a case where this state is also referred simply to as "servo control is performed").

Figure 7:
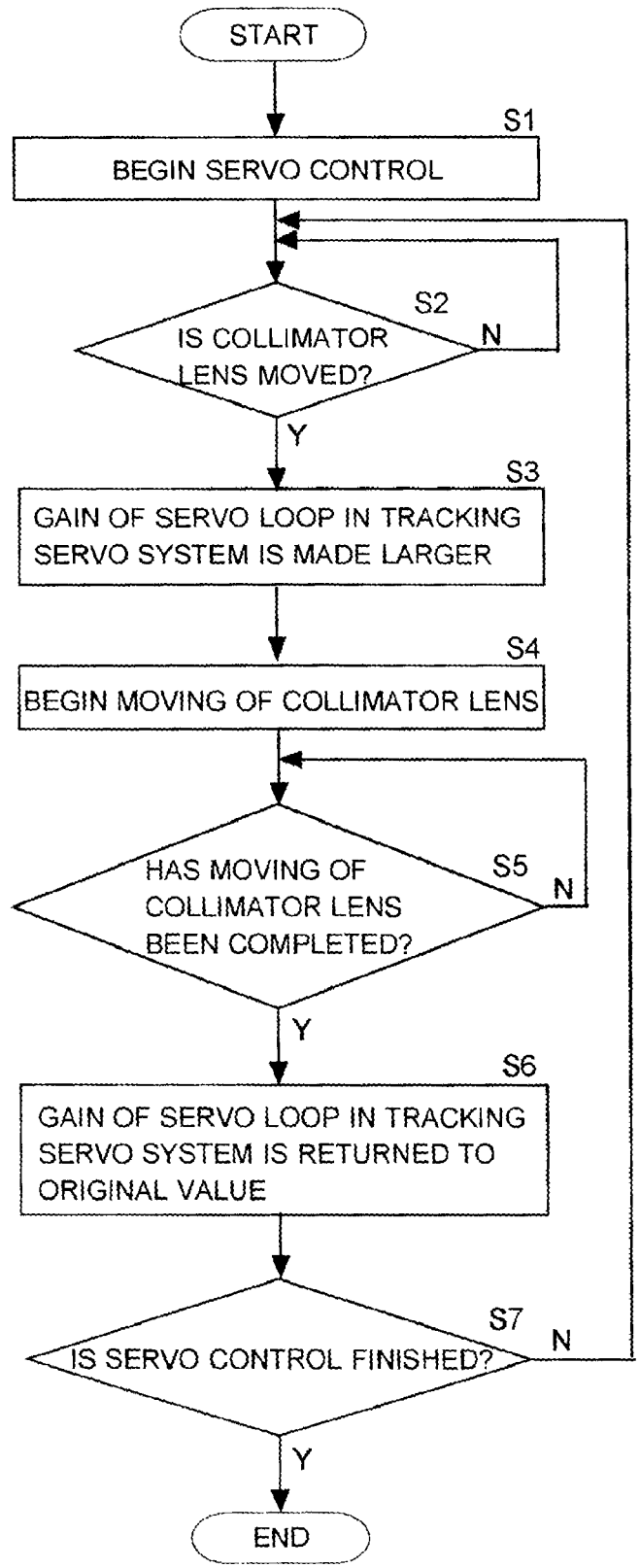
FIG. 7 is a flowchart to show process for switching of the gain of servo loop for the tracking servo system in the optical disc device according to the present embodiment.

FIG. 7 is shown about a state where gain value of the signal amplifier 152 is set in a predetermined gain value such that the most appropriate crossover frequency fc is realized by the gain value. There may be a case where the gain value is referred to as "ordinary gain value" in the explanation below.

When servo control of the optical disc device 1 is started (Step S1), it is checked by the CPU 17 whether moving of the collimator lens 105 is performed or not (Step S2). If moving of the collimator lens 105 is started, gain value of the signal amplifier 152 is made larger in a predetermined amount (+3 dB in this embodiment) than the ordinary gain value by the CPU 17, that is, the gain control part 171 (Step S3). Then, moving of the collimator lens 105 is started by driving of the lens moving portion 30 (Step S4).

In this respect the collimator lens 105 is moved, for example, in cases below, though it is not intended to limit the invention to it, of course. When the optical disc 100 is a multilayer disc such as double layer disc or the like, amount of the spherical aberration generated is different depending on position of information recording layer to perform reproduction therefrom. By this reason, position of the collimator lens 105 is moved such that the position becomes matched to the information recording layer to be reproduced, that is, the position is decided beforehand by means of experiment or the like so that the spherical aberration is prevented properly. This kind of moving is performed in a sate where reproduction of the optical disc 100 is not performed.

When moving of the collimator lens 105 is started (above described Step S4), it is checked whether moving of the collimator lens 105 has been completed or not by the CPU 17 (Step S5). Then, if the moving of the collimator lens 105 has been completed, gain of the signal amplifier 152 is made smaller (−3 dB in this embodiment) by the CPU 17, that is, by the gain control part 171, it is returned to the original (ordinary) gain value (Step S6). Thereafter, it is checked by the CPU 17 whether the servo control is finished or not (Step S7), if the servo control is not finished, steps after step S2 are repeated.

As above described, in the optical disc device 1 according to the present embodiment, structure is configured such that gain of the servo loop of the tracking servo system 2 is made temporarily larger in a predetermined amount, that is, amount that is decided beforehand as an appropriate value by experiment or the like when the lens moving portion 30 is driven in order to perform moving of the collimator lens 105. By this structure, in the optical disc device 1 according to the present embodiment, disorder in the TE signal can be prevented because disturbance due to driving of the lens moving portion 30 is prevented. That is, in the optical disc device 1 according to the present embodiment, possibility of occurrence of out of order of the servo control can be prevented while change of setting is performed in order to correct the spherical aberration.

In this respect, the embodiment shown above is mere an example, and scope of the present invention is not limited to the embodiment as above described, of course.

Figure 8:
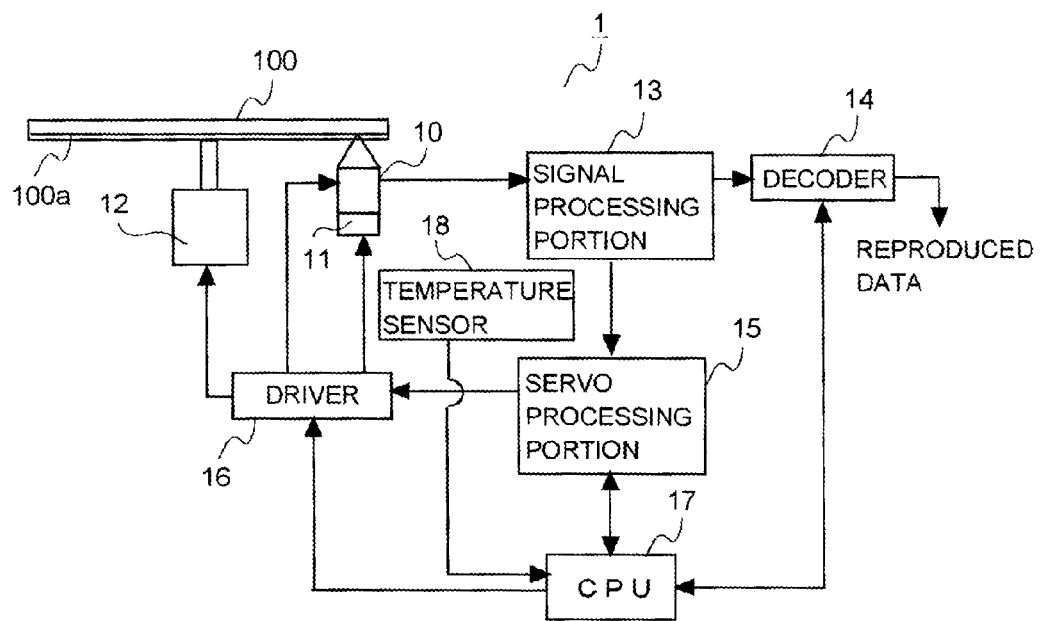
FIG. 8 is a block diagram to show modified example of the optical disc device according to the present embodiment.

For example, in case where the object lens 107 that is provide in the optical disc device 1 is made by resin, the spherical aberration may be fluctuated by change of temperature. For a counter measure to this, it is conceivable that structure is employed in that as shown in FIG. 8, a temperature sensor 18, that is, embodiment of a temperature detecting portion of the present invention, is provided in the optical pickup 10 in order to detect the environmental temperature of the object lens 107, and the lens moving portion 30 is driven based on the temperature detected by the temperature sensor 18. In the optical disc device 1 having structure like this, the collimator lens 105 is moved while reproducing or the like of the optical disc 100 is performed, for example. Therefore, when structure according to the present invention is applied to such kind of the optical disc device 1, very preferable effect can be obtained because servo control is made hardly out of order even when reproduction or the like of the optical disc 100 is performed.

In the embodiment above described, a case is explained where the movable lens to correct the spherical aberration is the collimator lens. However, it is conceivable also that a beam expander having a movable lens is utilized in order to correct the spherical aberration instead of utilizing the collimator lens as the movable lens. In this respect, even when the beam expander is utilized, there may be a case where disorder of the TE signal as above described is caused due to vibration generated while the lens is moved. That is, applicable field of the present invention is not limited to the case where the movable lens provided to correct the spherical aberration is the collimator lens, and the present invention can be applied to other cases.

Further, structure of the lens moving portion is also not limited to the above described structure of the embodiment. Application of the present invention is also effective to the optical disc device in that the lens moving portion has structure different from the present embodiment as far as disturbance is loaded to the object lens actuator due to driving of the lens moving portion.

Still further, in the embodiment shown as above, a case is explained where the optical disc device 1 is made for only reproducing, the present invention can be applied to even the optical disc device having information recording function.

The present invention can be applied widely to the optical disc device utilized for reproducing of information recorded in the optical disc, or for recording of information in the optical disc.

What is claimed is:
1. An optical disc device comprising:
a light source;
an object lens to focus light emitted from the light source on an information recording surface of an optical disc;
a movable lens that is arranged on an optical path between the light source and the objective lens and arranged such that position thereof is adjustable along a direction of a light axis;
a lens moving portion to move the movable lens along the direction of the light axis;
a tracking servo system which makes a beam spot that is formed of the light from the light source through focusing by the objective lens keep on track of the optical disc; and
a control part configured to control a gain of a servo loop of the tracking servo system,
wherein, when moving of the movable lens is started, and during a moving period of the movable lens, the gain of the servo loop is increased to a constant value larger than an ordinary gain value and, when moving of the movable lens is completed, the gain of the servo loop is restored from the increased value to the ordinary gain value.
2. The optical disc device according to claim 1, further comprising:
a temperature detecting portion configured to detect environmental temperature, wherein moving of the movable lens by the lens moving portion is performed based on temperature that is detected by the temperature detecting portion.

3. The optical disc device according to claim 1 wherein the movable lens is a collimator lens.

4. The optical disc device according to claim 2 wherein the movable lens is a collimator lens.

* * * * *